United States Patent [19]

Wagemakers et al.

[11] 4,193,107
[45] Mar. 11, 1980

[54] VARIABLE CAPACITOR

[75] Inventors: Adrianus J. Wagemakers; Johan C. J. A. Roozen; Jozephus J. M. Smit, all of Tilburg, Netherlands

[73] Assignee: U.S. Philips Corporation, New York, N.Y.

[21] Appl. No.: 882,272

[22] Filed: Feb. 28, 1978

[30] Foreign Application Priority Data

Mar. 8, 1977 [NL] Netherlands ................ 7702451

[51] Int. Cl.² .............................................. H01G 5/06
[52] U.S. Cl. .................................. 361/298; 29/25.41; 361/299
[58] Field of Search ............... 361/298, 299; 29/25.41; 156/73.1, 73.2

[56] References Cited

U.S. PATENT DOCUMENTS

| | | | |
|---|---|---|---|
| 3,002,871 | 10/1961 | Tramm | 156/73.2 |
| 3,404,322 | 10/1968 | Pepko | 361/298 |
| 4,089,093 | 5/1978 | Lefeber | 361/298 X |

FOREIGN PATENT DOCUMENTS

| | | | |
|---|---|---|---|
| 1128563 | 5/1962 | Fed. Rep. of Germany | 361/298 |
| 1439581 | 10/1968 | Fed. Rep. of Germany | |
| 1225628 | 3/1971 | United Kingdom | |

*Primary Examiner*—E. A. Goldberg
*Attorney, Agent, or Firm*—Thomas A. Briody; William J. Streeter; Bernard Franzblau

[57] ABSTRACT

A variable capacitor comprising a lower plate and an upper plate which are made of a synthetic material which is suitable for ultrasonic welding, said plates being provided with a number of engaging spacer columns which are integral with the plates and which are connected to each other by ultrasonic welding.

12 Claims, 5 Drawing Figures

VARIABLE CAPACITOR

The invention relates to a variable capacitor comprising a stator and a rotor which are clamped and arranged, respectively, between an upper plate made of a synthetic material suitable for ultrasonic welding and a lower plate also made of a synthetic material suitable for ultrasonic welding, the upper plate and the lower plate being maintained at a distance from each other by spacer columns which are coaxially situated relative to each other and which extend transversely of the plane of the plates, said spacer columns being formed to be integral with the relevant plates, at least two of the spacer columns having an at least partly tubular construction for connection of the upper plate to the lower plate.

In a capacitor of the described kind which is known from British patent specification No. 1,132,552 all spacer columns between the upper plate and the lower plate are tubular columns wherethrough draw bolts are inserted which are screwed into a separate metal supporting plate situated below the lower plate. The threaded holes in the supporting plate required for screwing down the bolts must be exactly situated relative to each other, and the fixing bolts themselves should also be extremely accurately manufactured. The draw bolts (four in the most commonly used construction) as well as the additional supporting plate give rise to a comparatively expensive construction which can be manufactured in bulk only by highly specialized skilled workers.

It is to be noted that from German patent application No. 1,439,581 (laid open to public inspection) a variable capacitor is known in which a spacer column of hot formable synthetic material is connected to a stator plate by hot upsetting. The spacer column is also connected, in a manner not shown, to a lower plate of synthetic material. A capacitor of this kind has a drawback in that the hot upsetting of the column causes a collar to be formed around the column, said collar being elastically or plastically readily deformable by the stator stack of the capacitor which is subject to a compression load. Consequently, said collar starts to bend so that the press-on force between the stator plates is no longer sufficient to ensure suitable electrical contact.

Finally, it is to be noted that from British patent specification No. 1,225,628 a connection is known between a hollow rod of synthetic material and a plate of synthetic material which extends transversely thereof. The connection is realized by ultrasonic deformation of an end of the rod which projects through a hole in the plate by means of sonotrodes of different shape. When use is made of this method of ultrasonic connection, the hollow rod of synthetic material is subjected to compression forces which may cause kinking when used in variable capacitors.

It is an object of the invention to provide a capacitor which is cheap to mass produce and wherein a sufficient press-on force between the stator plates is ensured. Accordingly, the invention is characterized in that a spacer column of one of the plates is inserted with clearance into the tubular part of one of the spacer columns connected to the other plate, an ultrasonic welded joint being present between the inner surface of the tubular column and the outer surface of the other column inserted therein. Said joint is situated at a distance from the end face of the tubular column such that part of the tubular columns is subject to a compression force, whereas a part of the other columns projecting into the tubular columns is subject to a tensile force.

The invention will be described in detail hereinafter with reference to the drawing in which.

Figure 1:
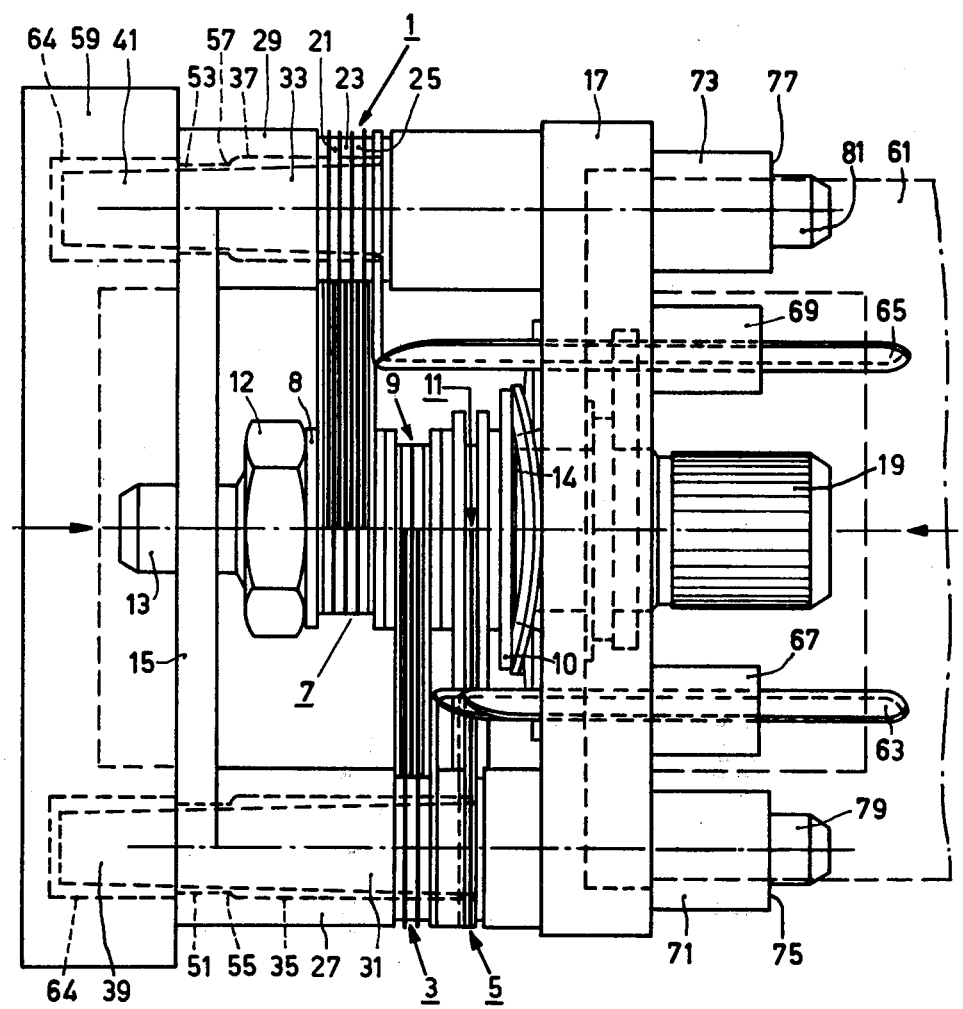
FIG. 1 is a side elevation of a preferred embodiment of a capacitor in accordance with the invention.

The capacitor shown in FIG. 1 is a capacitor of the so-called multiple type comprising a number of stator stacks 1, 3 and 5, and a number of rotor stacks 7, 9 and 11. Each of the stacks 1 and 7, 3 and 9, 5 and 11 forms a variable capacitor. The rotor stacks 7, 9, and 11 are secured on a rotor shaft 13 which is journalled near one end in an upper plate 15, while the other end is journalled in a lower plate 17. The rotor stacks 7, 9 and 11 are located between two supporting rings 8 and 10 which are located between a nut 12 and a shaft shoulder 14. Upon rotation of the rotor shaft 13, the rotor stacks 7, 9 and 11 are simultaneously rotated relative to the associated stator stacks 1, 3 and 5. The rotor shaft 13 can be rotated by means of a knurled control knob 19 which is provided near the end which is journalled in the lower plate 17. The stator stacks and the rotor stacks may be assembled in the usual manner from metal plates which are maintained at a distance from each other by metal spacer rings, each time a rigidly arranged dielectric foil being present between two rotor and stator plates in a stack which are situated directly opposite each other. The stator and/or rotor plates may alternatively be provided, however, with a dielectric layer such as paraxylylene. The loose dielectric foils can then be dispensed with. The stator plates are maintained at a distance from each other by metal space rings. For example, the four stator plates of the stator stack 1 are maintained at a distance from each other by the spacer rings 21, 23 and 25.

Figure 2:
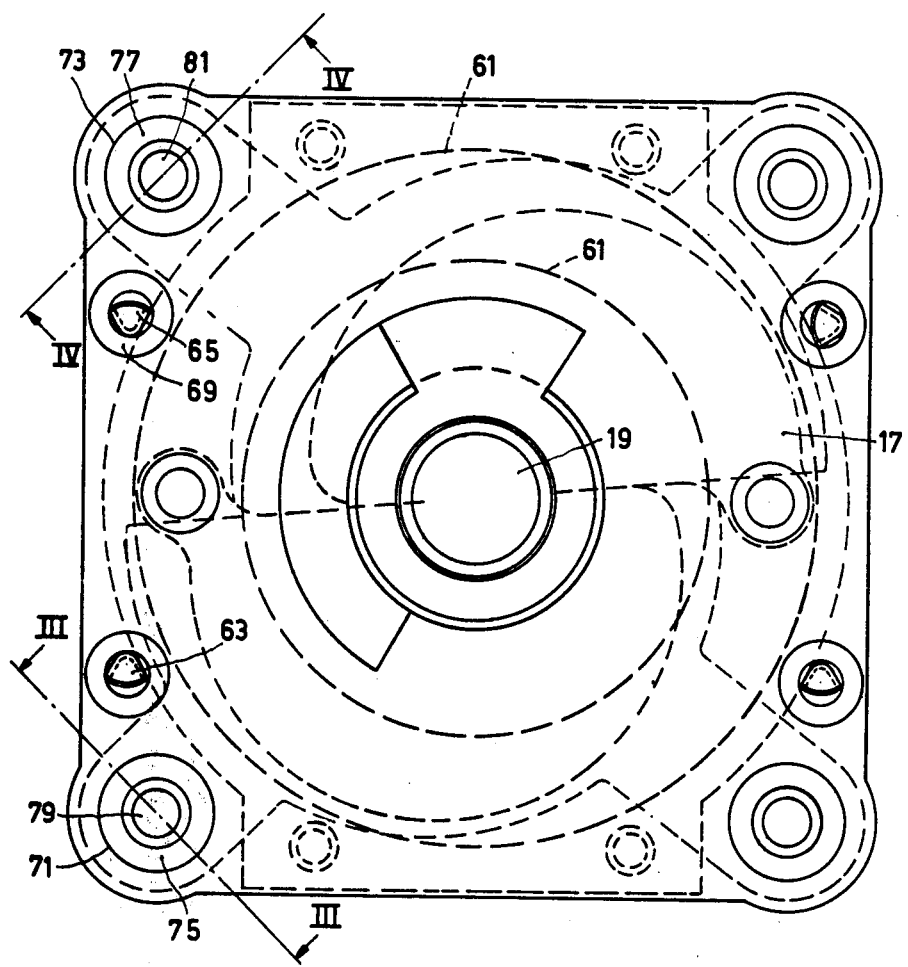
FIG. 2 is a bottom view of the capacitor shown in FIG. 1.
Figure 5:
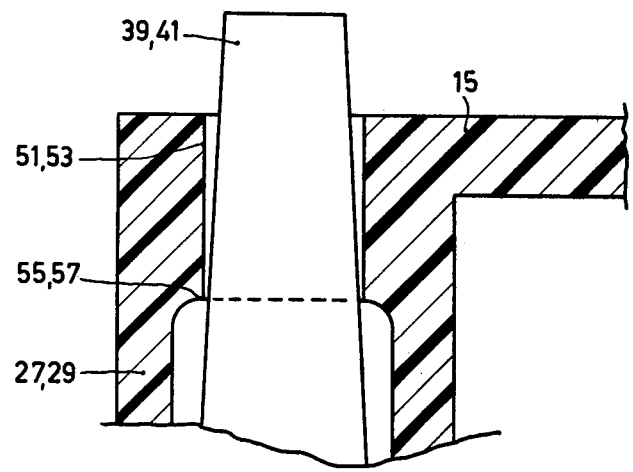
FIG. 5 is a detailed view of the area where the ultrasonic connection between the upper plate and a spacer column is formed.
Figure 3:
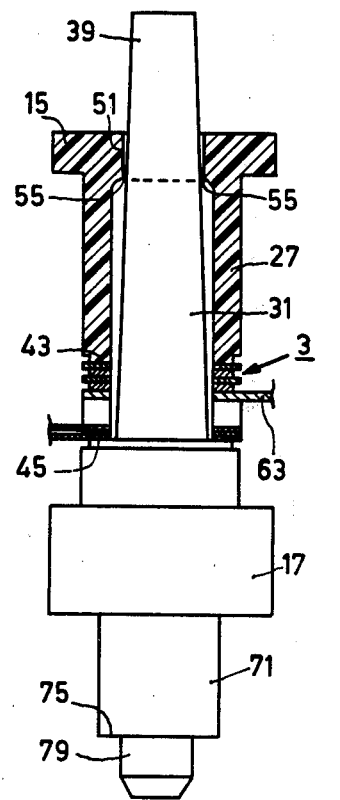
FIG. 3 is a cross-sectional view of a first pair of spacer columns of the capacitor shown in any of the other Figures.
Figure 4:
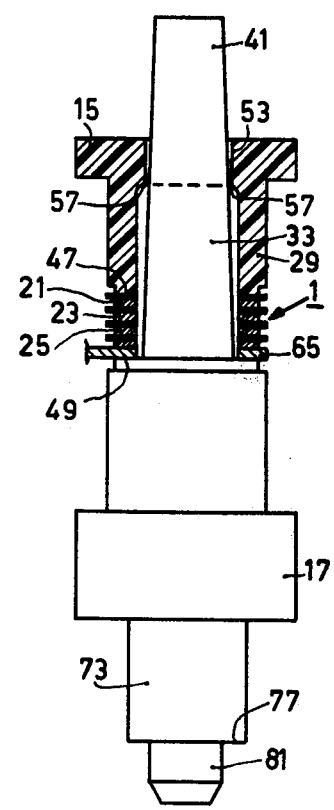
FIG. 4 is a cross-sectional view of a second pair of spacer columns of a capacitor as shown in any of the other Figures.

The upper plate 15 and the lower plate 17, which is parallel thereto, comprises four spacer columns which extend transversely of the plane of the plates, only two columns being visible in FIG. 1. Only the columns 27 and 29 of the four spacer columns associated with the upper plate 15 are visible, while of the four spacer columns associated with the lower plate 17 only the columns 31 and 33 are visible. The columns 27 and 29 comprise continuous, stepped, circle-cylindrical cavities 35 and 37 and thus have a tubular construction. The columns 31 and 33 of the lower plate 17 are solid and project through the tubular columns 27 and 29 by way of an end 39 and 41, respectively. The FIGS. 3, 4 and 5 show a more detailed cross-sectional view of the columns 27 and 31 and the columns 29 and 33, respectively, for the sake of clarity. The stator stacks 3 and 5 are clamped, with insertion of spacer rings, between an end face 43 of the tubular column 27 and a shoulder 45 of the solid column 31. The stator stack 1 is similarly clamped between an end face 47 of the tubular column 29 and a shoulder 49 of the solid column 33. As is clearly shown in FIG. 2, each stator stack is each time clamped between two pairs of spacer columns which are symmetrically situated relative to the centre of the capacitor.

Each of the four tubular columns comprises a comparatively narrow circle-cylindrical portion which has a diameter which is substantially equal to the diameter of the solid columns at the area of the ultra-sonic connection to be formed. For example, the tubular columns shown in the FIGS. 3, 4 and 5 comprise the comparatively narrow portions 51 and 53. The solid columns are preferably constructed to be slightly conical, with an inclination of 1:100. The diameter of the cylindrical solid columns 31 and 33 is chosen so that at the area of the reference numerals 55 and 57 a sliding fit is present or an annular opening is present having a width of no more than approximately 0.05 mm. The lower plate 17 and the (four) solid columns which are integral therewith are preferably made of the same synthetic material as the upper plate 15. The plates 15 and 17 are preferably injection moulded. For example, the following synthetic materials can be used for the plates 15 and 17:
polystyrene
styrene acrylonitrile
polycarbonate
acrylonitrile butadiene styrene (ABS)
polyacetal
polymethyl-metacrylate
polyamides
polypropylene
polyvinyl chloride (PVC)
polyphenylene oxide (PPD)
polysulphone.
Said synthetic materials are preferably filled with fibre glass in order to counteract creepage.

The capacitor shown in FIG. 1 is assembled by arranging the capacitor with the upper plate 15 on an anvil 59 and by subsequently supplying ultrasonic energy for some time to the capacitor frame by means of an ultrasonic welding electrode 61 (sonotrode) which is pressed against the lower plate 17. The sonotrode 61 is coupled to a known ultrasonic welding apparatus make Branson 17A. The press-on force of the sonotrode 61 is preferably between 40 and 45 P.S.I. The welding time amounts to approximately 0.07 seconds and the holding time amounts to 0.2 seconds for the capacitor shown in FIG. 1. During the welding time of 0.07 seconds a lateral oscillation occurs in the solid columns 31 and 33 which has an amplitude which is slightly higher than or equal to said 0.05 mm at the areas 55 and 57. Consequently, it is only at the areas 55 and 57 that a high mechanical friction occurs between the solid and the tubular columns such that an ultrasonic (annular) connection is formed. Approximately 0.2 seconds after the welding, the ultrasonic weld has cooled so far that adequate mechanical strength is obtained in the weld to allow removal of the capacitor from the welding equipment. The part of the solid columns of the completed capacitor which is situated above the shoulders 45 and 49 is subject to a tensile force, whereas the tubular columns are subject to a compression force. The compression force in the tubular columns ensures an adequate, permanent press-on force of the stator stacks 1, 3 and 5. Because intimate mechanical contact between the tubular and the solid columns occurs only at the areas 55 and 57 during welding, it is ensured that an ultrasonic connection is formed only at these areas. It is of essential importance that the location of the ultrasonic connection is well-defined in order to ensure that the press-on force of all end faces of the tubular columns on the stator stacks is adequate and equally large. The anvil 59 may be provided with four bores 64, but also with two bores 64 which are arranged diagonally opposite each other. In the former case all four ultrasonic connections are realized in one welding cycle, and it is advisable to arrange the anvil to be tiltable. In the latter case one pair of diagonally oppositely situated ultrasonic connections are realized in each of two welding cycles.

Simultaneously with the stator stacks, external connections 63 and 65 are clamped, said connections being guided in sleeves 67 and 69 injection moulded to the lower plate 17. Supports 71 and 73 are also injection moulded to the lower plate 17, shoulders 75 and 77 of said supports bearing on a printed wiring board. The supports 71 and 73 comprise cylindrical protrusions 79 and 81 which fit in holes of a printed wiring board. The protrusions 79 and 81 prevent movement of the capacitor during soldering and straining of the soldered connections between the connections 63 and 75 and the conductors on a printed wiring board after soldering when the capacitor is jolted. The control knob 19 is accessible through a hole in the printed wiring board and has a length such that the flow pattern in the flow soldering bath is not disturbed during flow soldering.

Finally, it is to be noted that in order to obtain a defined position of the ultrasonic connections, it is also possible to construct the solid spacer columns to be circle-cylindrical and to provide the upper plate with columns which have a partly conical bore or not. Comparatively abrupt reductions in the open space between tubular columns and solid columns can also be used.

What is claimed is:

1. A variable capacitor comprising, a stator and a rotor which are clamped and arranged, respectively, between an upper plate composed of a synthetic material suitable for ultrasonic welding and a lower plate composed of a synthetic material suitable for ultrasonic welding, the upper plate and the lower plate being maintained at a distance from each other by a plurality of first and second spacer columns which are coaxially situated relative to each other and which extend transversely of the plane of the plates, said first and second spacer columns being formed to be integral with the upper and lower plates respectively, at least two of the spacer columns having an at least partly tubular construction for connection of the upper plate to the lower plate, a spacer column of one of the plates being inserted with clearance into the tubular part of one of the spacer columns connected to the other plate, an ultrasonic welded joint being present between the inner surface of the tubular column and the outer surface of the other column inserted therein with said joint being situated at a distance from an end face of the tubular column such that a part of the tubular column is subject to a compression force and a part of the other column projecting into the tubular column is subject to a tensile force.

2. A capacitor as claimed in claim 1 wherein a space is formed between the inner surface of the tubular column and the outer surface of the column inserted therein, said space being smaller at the area of the ultrasonic joint to be formed than elsewhere in the tubular column.

3. A capacitor as claimed in claim 1 wherein the outer diameter of the other spacer column gradually decreases, at least near the ultrasonic joint, to a value which, at the area of the ultrasonic joint, substantially equals the inner diameter of a tubular spacer column into which said other spacer column is inserted.

4. A capacitor as claimed in claim 1 or 2 wherein the stator comprises a number of metal plates which are separated from each other by spacer rings and which are clamped between an end face formed on a tubular spacer column and a shoulder formed on the spacer column inserted into the tubular column.

5. A capacitor as claimed in claim 1 wherein the upper and the lower plate and the spacer columns which are integral therewith are made of a polycarbonate material with a fibre glass filling.

6. A capacitor as claimed in claim 3 wherein said other spacer column comprises a solid conical shaped member.

7. A variable capacitor assembly comprising, first and second spaced apart parallel arranged plates composed of a synthetic material suitable for ultrasonic welding, each of said plates having a plurality of spacer columns integral therewith and extending transversely of the plane of the respective plate with at least two of the spacer columns of the first plate having an at least partly tubular configuration, the spacer columns of the first plate being arranged coaxial with corresponding spacer columns of the second plate and with a spacer column of the second plate positioned within the tubular part of the corresponding spacer column of the first plate with a given lateral clearance, said spacer columns maintaining the first and second plates spaced apart at a fixed distance by means of an ultrasonic welded joint formed between an inner surface of a tubular column and an outer surface of a spacer column of the second plate positioned therein with said joint being located at a distance from an end face of the tubular column so that a part of the tubular column is subject to a compression force and a part of said column of the second plate is subject to a tensile force, at least one stator plate secured to a spacer column, and a rotor shaft having at least one rotor plate mounted thereon and rotatably mounted in said first and second plates.

8. A capacitor as claimed in claim 7 wherein said first and second plates and their respective spacer columns are each formed from a homogeneous mass of said synthetic material to form first and second unitary one-piece structures prior to assembly of the capacitor.

9. A capacitor as claimed in claim 7 wherein the spacer columns of said first and second plates are each made of the same synthetic material as their respective plates.

10. A capacitor as claimed in claim 7 wherein the diameter of at least a part of a confronting surface of one spacer column gradually varies to form a conical configuration so that the inner and outer confronting surfaces of a pair of coaxial spacer columns form a variable annular space therebetween in which the confronting surfaces are joined together in the area of the ultrasonic joint.

11. A capacitor as claimed in claim 7 wherein a spacer column of the second plate has a shoulder formed thereon parallel to the plane of the plate and an end face of the corresponding tubular spacer column facing said shoulder is parallel thereto and said stator plate is secured to the spacer column by being clamped between said end face of the tubular column and the shoulder of the spacer column of the second plate.

12. A capacitor as claimed in claim 7 wherein the welded joint is formed by pressing an ultrasonically vibrating sonotrode against the second plate with the first and second plates arranged in parallel relationship and with at least one spacer column of the second plate inserted coaxially within a corresponding tubular spacer column of the first plate.

* * * * *